United States Patent
Bernhardt et al.

(10) Patent No.: US 6,508,876 B1
(45) Date of Patent: Jan. 21, 2003

(54) COLORED INTERFERENCE PIGMENT

(75) Inventors: Klaus Bernhardt, Gross-Umstadt (DE);
Hans-Dieter Brückner, Darmstadt (DE); Karl Osterried, Dieburg (DE);
Reiner Vogt, Darmstadt (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 0 days.

(21) Appl. No.: 09/500,920

(22) Filed: Feb. 9, 2000

(30) Foreign Application Priority Data

Feb. 10, 1999 (DE) .......................................... 199 05 427

(51) Int. Cl.[7] ................................................. C09C 1/28
(52) U.S. Cl. ...................... 106/415; 106/419; 106/425; 106/436; 106/450; 106/456; 106/472; 106/480; 106/479
(58) Field of Search ................... 106/415, 419, 106/425, 436, 450, 456, 472, 479, 480

(56) References Cited

U.S. PATENT DOCUMENTS 5,156,678 A    10/1992  Glausch ....................... 106/410
6,063,179 A  *  5/2000  Schmid et al. ............... 106/415

FOREIGN PATENT DOCUMENTS

EP    0 499 864 B1    2/1992
EP    0 608 388 B1    10/1992

OTHER PUBLICATIONS

English Abstract of EP 0 608 388 B1.
English Abstract of EP 0 499 864 B1.

* cited by examiner

Primary Examiner—C. Melissa Koslow
(74) Attorney, Agent, or Firm—Millen, White, Zelano & Branigan, P.C.

(57) ABSTRACT

A colored interference pigment having a platelet-shaped layer as substrate, a coating of at least one metal oxide layer and, optionally, a further layer, at least two layers comprising or consisting of colorants.

16 Claims, 1 Drawing Sheet

(2) Coating
(1) Substrate
(3) Colorant (2) Coating
(1) Substrate
(3) Colorant
(4) Colorant layer (2) Coating
(1) Substrate
(3) Colorant
(4) Colorant layer (2) Coating
(1) Substrate
(3) Colorant
(4) Colorant layer

COLORED INTERFERENCE PIGMENT

The present invention relates to a colored interference pigment comprising absorption pigments in the carrier material and in the coating.

BACKGROUND OF THE INVENTION

Interference pigments which comprise absorption pigments either in the substrate or in the coating are known.

EP 0 608 388 describes $SiO_2$ flakes comprising soluble or insoluble colorants and produced on a continuous belt. Insoluble colorants used are pigments having a particle size of less than 1 μm, pigments meaning white, black, colored or fluorescent pigments. The pigments are dispersed in the precursor of the $SiO_2$ matrix, for example in a sodium waterglass solution, and the dispersion is applied to the continuous belt. Soluble colorants which may be present in the $SiO_2$ matrix are chromophoric metal oxides or soluble organic pigments. In this case, solutions of these colorants are added to the precursor prior to application to the continuous belt. The $SiO_2$ flakes produced in this way are used as substrates for interference pigments.

Interference pigments comprising carbon black as an absorption pigment in the metal oxide coating are known from EP 0 499 864. They are prepared by mixing a substrate dispersion and a carbon black dispersion, metering in the aqueous solution of a metal salt, and precipitating a metal oxide layer on the substrate, in the course of which the carbon black is entrained and becomes embedded in the metal oxide layer. The pigment is subsequently calcined at from 700 to 900° C. in the absence of oxygen.

Interference pigments enveloped by a thin layer of an organic dye are known from U.S. Pat. No. 5,156,678. They are prepared by preparing a suspension of the pigment in a solution of the dye and mixing the resultant suspension with a solvent in which the dye is insoluble.

With platelet-shaped pigments, it is often difficult to achieve hiding power and luster simultaneously to a satisfactory extent.

For instance, $SiO_2$ flakes or mica platelets coated, for example, with one or more thin metal oxide layers are distinguished by interference colors and a high luster but also at the same time, as a result of the transparent substrate, by a high transparency and hence a comparatively low hiding power. The need therefore exists to improve the hiding power.

In the case of pigments which, besides the metal oxide layer which is responsible for generating the interference color, comprise only an absorption pigment, optical effects such as color flops, for example, are limited. The need therefore exists to expand the optical effects of these pigments.

SUMMARY OF THE INVENTION

It is an object of the present invention to provide an interference pigment which possesses not only a high hiding power but also comparatively more optical effects.

Upon further study of the specification and appended claims, further objects and advantages of this invention will become apparent to those skilled in the art.

Such objects are achieved, for example, by means of an interference pigment having a platelet-shaped layer as substrate, at least one coating of at least one metal oxide layer and, optionally, a further layer, at least two layers comprising or consisting of colorants.

Such objects are additionally achieved by a process for preparing the pigment of the invention, in which
- a colorant is dispersed or dissolved in a precursor of the substrate material,
- the dispersion is applied as a thin film to a continuous belt,
- the liquid film is solidified by drying, the resultant layer is separated from the belt and, if desired, is treated with an acid,
- the resultant substrate particles are washed and then coated with one or more layers of metal oxides, the precipitation of the metal oxides taking place from a dispersion or solution of a colorant.

The invention additionally provides for the use of the pigments of the invention for pigmenting paints, printing inks, plastics, cosmetics and glazes for ceramics and glasses. For this purpose they can also be employed as mixtures with commercially customary pigments, examples being organic and inorganic absorption pigments, metal effect pigments and LCP pigments.

In a first embodiment, the pigment of the invention consists of a platelet-shaped substrate (1) and of a coating (2) of at least one metal oxide layer, the pigment in the substrate (1) and in the coating (2) comprising at least one colorant (3). The structure of this pigment is shown in FIG. 1.

In a second embodiment, the pigment of the invention consists of a platelet-shaped substrate (1), of a coating (2) of at least one metal oxide layer, and of a colorant layer (4), the pigment in the substrate (1) and in the coating (2) comprising at least one colorant (3). The structure of this pigment is shown in FIG. 2.

In a third embodiment, the pigment of the invention consists of a platelet-shaped substrate (1), of a coating (2) of at least one metal oxide layer, and of a colorant layer (4) on the coating (2), the substrate comprising at least one colorant (3) The structure of this pigment is shown in FIG. 3.

In a fourth embodiment, the pigment of the invention consists of a platelet-shaped substrate (1), of a coating (2) of at least one metal oxide layer, and of a colorant layer (4) on the coating (2), the pigment in the coating (2) comprising at least one colorant (3). The structure of this pigment is shown in FIG. 4.

In case of the embodiments 2 to 4 of the pigment according to the invention the substrate can be repeatedly laminated with the two-layer system consisting of the coating (2) and the colorant layer (4). However, a laminating from one coating (2) and one colorant layer (4) is preferred.

The pigments of the invention are based on platelet-shaped substrates. These substrates may consist, for example, of silica, silicates, boron oxide, borates, alumina or other transparent, stable materials capable of accommodating the soluble or insoluble colorants.

Precursors used for preparing the substrates are solutions of organic or inorganic compounds of the metals aluminum, silicon, potassium or sodium with borates, aluminates, polyphosphates, metaphosphates, silicates and mixtures thereof. A preferred precursor is waterglass.

In the case of the embodiment 4 of the pigment of the invention, the substrate may also consist of mica, synthetic mica, other phyllosilicates or glass flakes.

The platelet-shaped substrate particles preferably have a thickness of from 0.05 to 5 μm and, in particular, from 0.2 to 2 μm. The extent in the two other dimensions is preferably from 1 to 250 μm and, in particular, from 2 to 100 μm.

In accordance with the embodiments 1 to 3 of the pigment of the invention, pigment particles whose dimensions are markedly smaller than the thickness of the substrate are incorporated as insoluble colorants into the substrate. The particle size of the commercially customary pigments must therefore be adapted to the desired layer thickness of the substrate. The term pigment particles as the colorants here is to be interpreted broadly and embraces white, black, colored and fluorescent pigments.

Suitable inorganic pigments are white pigments such as titanium dioxide, barium sulphate or zinc oxide, examples being titanium dioxide 2310 (manufacturer: Kronos), titanium dioxide R-D (manufacturer: Bayer), and titanium dioxide R-506 (manufacturer: Sachtleben).

Suitable black pigments are magnetite or pigment-grade carbon black, an example being Farbruβ FW 200 (Degussa).

Suitable colored pigments are iron oxide or chromium oxide, mixed-phase oxides such as (Ti, Cr, Sb)$O_2$, $CoAl_2O_4$ (Thenard's Blue), $ZnAl_2O_4$ (Rinman's Green), $(Fe, Cr)_2O_3$ and also sulphides, for example CdS.

Also, suitable are inorganic fluorescent pigments, such as fluorescent silver-doped zinc oxide, phosphorescent copper-doped zinc sulphide, or ultramarine pigments.

Suitable organic pigments are azo pigments, anthraquinone pigments, indigo or thioindigo derivatives, diketopyrrolopyrrole pigments, perylene pigments and phthalocyanine pigments. Particularly suitable red pigments are Paliogen Maron L3920 (manufacturer: BASF), DPP-Irgazine Red BO (manufacturer: Ciba), Chinquaisia Margenta RT355D (manufacturer: Ciba), Hostaperm Red E2B70 (manufacturer: Hoechst B Clariant), Sicotrans Red L2817 (manufacturer: BASF), Carmine Red, Thioindigo, DC Red 6, also known as Lithol Rubine 13, and also DC Red 33, also known as Acid Fuchsine.

Particularly suitable blue pigments are Hostaperm Blue AFL (manufacturer: Hoechst B Clariant), Irgazine Blue A3RN (manufacturer: Ciba), Paliogen Blue L6470 (manufacturer: BASF) Prussian Blue, and FDC Blue 1, also known as Brilliant Blue. Particularly suitable green pigments are Monastral Green 64 Special (manufacturer: Zeneca B ICI), Hostaperm Green 8G (manufacturer: Hoechst B Clariant), and DC Green 5, also known as Alizarin Cyanine Green F, and particularly suitable yellow pigments are Irgazin Yellow 5GTL (manufacturer: Ciba), Irgacolor Yellow 2GLMA (manufacturer: Ciba), FDC Yellow 5, also known as Tartrazine, and FDC Yellow 6, also known as Sunset Yellow.

For improved dispersion of the pigment particles in the precursor it is advantageous in many cases to add wetting agents as well, an example being Hydropallat 884 (manufacturer: Henkel). Neither the type nor the amount of the wetting agent added is critical, although in general the proportion of the wetting agent is not more than 2% by weight based on the dispersion.

The proportion by weight of the incorporated pigment particles, based on the weight of the uncoated substrate, is preferably from 0.5 to 40% and, in particular, from 5 to 25%. Further details can be found in European Patent 0 608 388.

Alternatively, the colorant present in the substrate may be a soluble colorant. The term soluble colorant denotes either a chromophoric metal oxide, examples being iron oxide, chromium oxide and cobalt oxide, or a soluble organic dye.

Chromophoric compounds generally suitable for the coloring of the substrate are compounds of the metals titanium, vanadium, chromium, manganese, iron, cobalt, nickel and copper, preferably compounds of cobalt, copper, iron and chromium. They are added as soluble compounds to the precursor of the substrate. The result is a colored, transparent substrate having a color scale similar to that of colored, transparent glass. Adding iron compounds, for example, gives reddish brown hues, adding chromium compounds gives green hues, and adding cobalt compounds gives blue hues.

As soluble organic dyes it is possible to employ alkali-soluble hydroxyanthraquinone dyes or acidic azo dyes.

The soluble colorant is preferably present in the uncoated substrate in a proportion of from 0.01 to 50% by weight, preferably from 1 to 30% by weight. Further details can be found in EP 0 608 388.

The pigments of the invention may also include additional colorants in the metal oxide coating. For example, if particles of carbon black are used, then the particle sizes used are from 5 to 200 nm, and in particular, from 10 to 100 nm. Pigments of this kind, which preferably contain carbon-black particles in layers of titanium dioxide, iron oxide, tin oxide, chromium oxide and zinc oxide, are described in EP 0 499 864.

The pigments of the invention may also comprise particles of titanium dioxide, alumina, silica, tin dioxide, magnesium oxide, zinc oxide, cerium dioxide, tungsten oxide, molybdenum oxide and zirconium oxide or else mixed oxides, such as $Cr_2FeO_4$, $CoAl_2O_4$ or $NiAl_2O_4$, in the metal oxide layer.

Instead of inorganic pigment particles it is also possible for organic pigment particles to be present in the metal oxide layer, particular preference being given to thermally stable organic pigments. Organic pigment particles used are preferably phthalocyanines, lakes of basic dyes with heteropolyacids, anthraquinones, phenazines, phenoxazines, diketopyrrolopyrroles or perylenes. In principle, all pigments which have been described for incorporation into the substrate can also be incorporated into the coating of the pigment of the invention. The incorporation of small metal oxide particles or organic pigment particles having an average size of from 10 to 40 nm into the cavities of the metal oxide coating brings about a marked increase in the hiding power and in the luster, together with great homogeneity of the coating in comparison to pigments obtained by coprecipitation. The hiding power and, in the case of colored pigment particles, the viewing-angle-dependent absorption color of the pigments of the invention can be varied within a wide range by varying the concentration of the pigment particles incorporated. The mass fraction of the incorporated pigment particles, based on the matrix, is preferably from 0.5 to 30% and, in particular, from 2 to 20%. Further information on pigments which comprise pigment particles in the coating can be found in DE 41 40 295.

In the case of a colorant layer on the metal oxide coating, the colorant may, in accordance with U.S. Pat. No. 4,772,331, form the outermost layer of the pigment together with an organic binder.

However, it is also possible to apply phthalocyanine dyes or metal phthalocyanine dyes without the aid of binder systems or other auxiliaries, as a firmly adhering outer layer, in accordance with U.S. Pat. No. 5,156,678. Alternatively, the colorants can be applied to the metal oxide coating by a high-speed stirring process in accordance with U.S. Pat. No. 5,336,309.

The proportion of the colorant which forms the outer layer is preferably from 0.5 to 30% by weight, more preferably from 1 to 10% by weight, based on the total pigment. It is possible in principle to employ all colorants which are also suitable for coloring the substrate.

The pigment of the invention is prepared in a two-stage process. In the first stage, the platelet-shaped substrate is prepared with the aid of a continuous belt.

The continuous belt, which is guided over a system of rollers, passes through an applicator where it is coated with a thin film of the precursor. The precursor, alternatively, contains either organic or inorganic pigment particles in the form of a dispersion, or contains dissolved dyes or chromophoric metal compounds.

Suitable applicators which can be employed are roll applicators and also flow-type applicators. The belt speed is preferably from 2 to 800 m/min, more preferably from 5 to 400 m/min.

In order to achieve uniform wetting of the plastic belt it is judicious to add a commercially customary wetting agent to the coating solution or dispersion or to activate the belt surface by means of flame treatment, corona treatment or ionization.

The coated belt then passes through a drying section in which the layer is dried at temperatures between 30 and 200EC. Dryers which can be used include, for example, commercially customary infrared dryers, circulating-air jets and UV dryers.

After passing through the drying section, the belt is guided through detachment baths filled with water or dilute acids, in which the dried layer is removed from the belt. The detachment process is supported here by additional apparatus, such as jets, brushes or ultrasound, for example. An afterdryer dries the belt before the next coating operation.

The continuous belt should be made of a chemical- and heat-resistant polymer in order to ensure a sufficient service life and high drying temperatures. Materials suitable for this purpose are those such as polyethylene terephthalate (PET) or other polyesters and polyacrylates.

The film width is typically from a few centimeters to several meters. The thickness is preferably from 10 $\mu$m to a few mm, these two parameters being optimized with respect to the particular requirements.

Further details relating to continuous belt processes are known from U.S. Pat. No. 3,138,475, EP 0 240 952 and EP 0 608 388.

Aqueous solutions of thermally hydrolyzable titanium compounds are used as the precursor for preparing titanium dioxide platelets as the substrate. A preferred precursor is aqueous titanium tetrachloride solution. The concentration is preferably from 7 to 30% by weight, more preferably from 8 to 15% by weight.

The titanium dioxide platelets have a thickness of from preferably 10 nm to 500 nm, more preferably from 40 to 150 nm. The extent in the two other dimensions is preferably up to 200 $\mu$m and, in particular, from 5 to 50 $\mu$m.

The production of $TiO_2$ flakes on a continuous belt is described in DE 196 18 564.

As the precursor for the production of silica platelets as a substrate use is made of a dilute waterglass solution which is adjusted to a concentration of from 10 to 30% by weight.

The silica platelets have a thickness of between 50 and 2000 nm and, in particular, between 100 and 1000 nm. The extent in the two other dimensions is between 1 and 10,0000 $\mu$m, in particular between 10 and 100 $\mu$m.

When waterglass is used as the precursor it is necessary to subject the substrate particles to an acid treatment following detachment from the belt.

In a second stage of the process, without drying them in between, the platelet-shaped substrate particles detached from the belt are coated with further metal oxides in accordance with known processes. If a titanium dioxide layer is applied as a coating to the substrate, it is preferred to use the process described in U.S. Pat. No. 3,553,001.

An aqueous titanium salt solution is slowly added to a suspension, heated at 50–100° C., especially 70–80° C., of the platelet-shaped substrate particles and of a pigment which is to be incorporated into the titanium dioxide layer, and a substantially constant pH of about 0.5–5, especially about 1.5–2.5, is maintained by simultaneous metered addition of a base, such as aqueous ammonia solution or an aqueous alkali metal hydroxide solution, for example. As soon as the desired layer thickness of the precipitated $TiO_2$ has been reached, the addition of the titanium salt solution is stopped.

This process, which is also known as the titration process, is notable for the fact that it avoids an excess of titanium salt. This is achieved by supplying to the hydrolysis per unit time only that amount which is required for a uniform coating with the hydrated $TiO_2$ and which can be accommodated per unit time by the available surface area of the particles that are to be coated. As a result, there is no formation of hydrated titanium dioxide particles which are not deposited on the surface to be coated. The amount of titanium salt added per minute in this case is within the order of magnitude of from about 0.01 to $20 \cdot 10^{-5}$ mol of titanium salt per square meter of surface to be covered.

The pigment particles or dye particles that are to be incorporated into the titanium dioxide layer can also be finely dispersed in the titanium salt solution or can be added separately to the substrate dispersion, simultaneously with the metal salt solution, in the form of an aqueous dispersion. Titanium oxide hydrate is precipitated, and the pigment particles or dye particles present in the reaction medium are entrained and incorporated into the cavities of the precipitated water-containing oxide layer. The coated substrate is separated off, washed and dried, and, if desired, is then calcined at temperatures between 50 and 1100° C., preferably at from 50 to 150° C. The incorporation of pigment particles and dye particles in metal oxide layers by precipitation is described in DE 41 40 295.

Instead of titanium dioxide, the substrate can also be coated with other metal oxides. Examples of suitable metal oxides or mixtures thereof are zirconium oxide, zinc oxide, iron oxides and/or chromium oxide, especially $Fe_2O_3$.

The coating of $SiO_2$ flakes with metal oxides is known from EP 0 608 388. In addition, the deposition of metal oxides or metal oxide mixtures on platelet-shaped substrates by wet-chemical means is described in the German patents and patent applications 14 67 468, 19 59 998, 20 09 566, 22 14 545, 22 15 191, 22 44 298, 23 13 331, 25 22 572, 31 37 808, 31 37 809, 31 51 343, 31 51 354, 31 51 355, 32 11 602 and 32 53 017.

In one particular embodiment of the pigment of the invention, an additional colorant layer is deposited as the outermost layer on the metal oxide layer. This colorant can be embedded in a binder in accordance with U.S. Pat. No. 4,772,331. The preparation takes place by mixing a suspension or solution of the colorant and organic binder in water and/or alcohol with a suspension of the platelet-shaped pigment in a solution of an organic binder in water and/or alcohol, the colorant being precipitated onto the surface of the platelet-shaped pigment and being bound by the organic binder.

Alternatively, the colorant can be applied to the pigment without the need for a binder. A suspension of the pigment in a solution of the colorant is mixed with a solvent in which the colorant is insoluble. As a result, the colorant is deposited on the pigment and forms a firmly adhering layer. This process is described in U.S. Pat. No. 5,156,678.

A further possibility is to apply the colorant to the pigment using a high-speed stirring process, in which pigment and colorant are mixed intensively with one another in the dry state. This process is described in U.S. Pat. No. 5,336,309.

Furthermore, the outermost colorant layer may consist of a color lake, especially an aluminum lake. To this end, an aluminum hydroxide layer is precipitated on and, in a second step, is laked with a lake colorant. The process is described in more detail in U.S. Pat. Nos. 4,084,983 and 4,323,554.

It is possible to subject the finished pigment to an aftercoating or aftertreatment, which increases the light stability, weathering stability and chemical stability or facilitates the handling of the pigment, especially its incorporation into different media. Suitable aftercoatings or aftertreatments are, for example, the processes described in DE-C 22 15 191, DE-A 31 51 354, DE-A 32 35 017 or DE-A 33 34 598.

The additionally applied substances make up only about from 0.1 to 5% by weight, preferably about from 0.5 to 3% by weight, of the total pigment.

The examples which follow are intended to illustrate the invention without restricting it.

Interesting color effects can be generated with the pigments of the invention. If, for example, the colorant layer on the metal oxide coating is blue, the interference color is gold and the color of the substrate is red, then green is obtained on slight deviation from the glancing angle and a bluish silver is obtained on even greater deviation, while the mass tone is bluish violet. If, for example, the colorant layer on the metal oxide layer is red, the interference color is gold and the color of the substrate is blue, then orange is obtained on slight deviation from the glancing angle and a reddish silver is obtained on even greater deviation, while the mass tone is reddish violet.

With this combination of two absorption pigments with metal oxide layers which generate the interference colors, it is possible to employ thermally sensitive colorants as the outermost layer, since in such cases all that remains is to dry the pigment.

The entire disclosure of all applications, patents and publications, cited above and below, and of corresponding German Application No. 199 05 427.4, filed Feb. 10, 1999 is hereby incorporated by reference.

EXAMPLES

Figure 1:
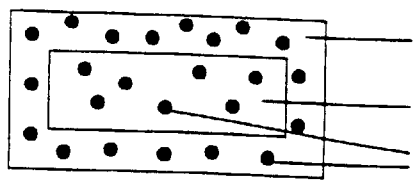
FIG. 1 schematically depicts one embodiment of a pigment according to the invention.
Figure 2:
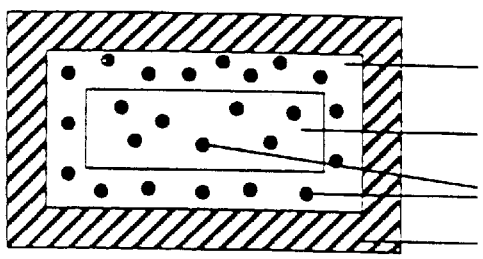
FIG. 2 schematically depicts another embodiment of a pigment according to the invention.
Figure 3:
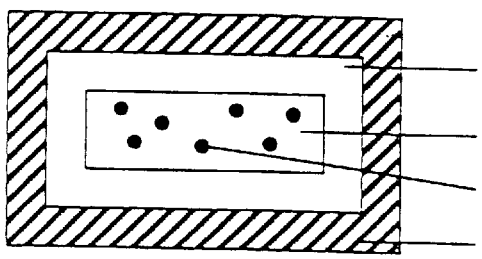
FIG. 3. schematically depicts another embodiment of a pigment according to the invention.
Figure 4:
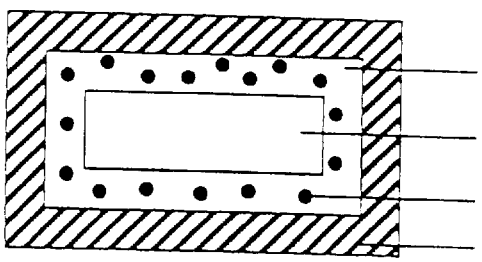
FIG. 4 schematically depicts another embodiment of a pigment according to the invention.

In the foregoing and in the following examples, all temperatures are set forth uncorrected in degrees Celsius; and, unless otherwise indicated, all parts and percentages are by weight.

Example 1

In a bead mill, 500 ml of a 3% dispersion of DPP BO Red particles (Ciba) are prepared. To aid dispersion, 0.5% of a dispersing additive (Hydropallat 884 from Henkel) are added. This suspension is then mixed 1:1 with waterglass. This dispersion is converted as described in PCT/EP 92/02351, with the aid of a continuous belt, into $SiO_2$ flakes which contain DPP Red particles.

100 g of the flakes obtained in this way are suspended in 2 l of water and heated to 75° C. A solution consisting of 10 g of $SnCl_4.5H_2O$ and 30 ml of 37% strength HCl in 200 ml of water is metered into the suspension. During the addition, the pH is kept constant with 32% strength NaOH solution. After the end of the addition of the $SnCl_4$ solution, 450 ml of $TiCl_4$ solution (400 g of $TiCl_4$/l of water) are metered in. During coating, the pH is kept constant by adding 32% strength NaOH solution. After the end of the addition, stirring is continued at 75° C. for 15 minutes. The pigment is filtered off, washed free of salt and dried at 150° C.

50 g of the product obtained in this way are suspended in 1 l of water and heated to 75° C. A solution of 6 g of $AlCl_3.6H_2O$ in 100 ml of water is metered into the suspension at a pH of 8, the pH being kept constant by simultaneous addition of 10% strength NaOH. After a 30-minute stirring phase a pH of 4.3 is established and 2 ml of Ethomeen S12 are added. Then a solution of 0.3 g of $AlCl_3.6H_2O$ in 100 ml of water and a solution of 1 g of Duasyn Acid Blue AE02 in 100 ml of water are metered in. During coating, there is virtually no change in the pH, which is regulated by adding a few drops of 5% strength HCl. This is followed by the addition first of 50 ml of a dilute sodium waterglass solution (7.5 ml of sodium waterglass diluted with 42.5 ml of water) and then of 2.5 g of $AlK(SO_4)_2$ dissolved in 50 ml of water, without regulating the pH. The product is filtered off with suction, washed free of salt and dried at 80° C.

Example 2

In a bead mill, 500 ml of a 3% dispersion of cobalt oxide particles are prepared. To aid dispersion, 0.5% of a dispersing additive (Hydropallat 884 from Henkel) are added. This suspension is then mixed 1:1 with waterglass. This dispersion is converted as described in PCT/EP 92/02351, with the aid of a continuous belt, into $SiO_2$ flakes which contain blue cobalt oxide particles. 100 g of the flakes obtained in this way are suspended in 2 l of water and heated to 75° C. A solution consisting of 10 g of $SnCl_4.5H_2O$ and 30 ml of 37% strength HCl in 200 ml of water is metered into the suspension. During the addition, the pH is kept constant with 32% strength NaOH solution. After the end of the addition of the $SnCl_4$ solution, 450 ml of $TiCl_4$ solution (400 g of $TiCl_4$/l of water) are metered in. During coating, the pH is kept constant by adding 32% strength NaOH solution. After the end of the addition, stirring is continued at 75° C. for 15 minutes. The pigment is filtered off, washed free of salt and dried at 150° C.

50 g of the product obtained in this way are suspended in 1 l of water and heated to 75° C. solution of 6 g of $AlCl_3.6H_2O$ in 100 ml of water is metered into the suspension at a pH of 8, the pH being kept constant by simultaneous addition of 10% strength NaOH. After a 30-minute stirring phase a pH of 4.3 is established and 2 ml of Ethomeen S12 are added. Then a solution of 0.3 g of $AlCl_3.6H_2O$ in 100 ml of water and a solution of 1 g of Allura Red (FDC Red 40) in 100 ml of water are metered in. During coating, there is virtually no change in the pH, which is regulated by adding a few drops of 5% strength HCl. This is followed by the addition first of 50 ml of a dilute sodium waterglass solution (7.5 ml of sodium waterglass diluted with 42.5 ml of water) and then of 2.5 g of $AlK(SO_4)_2$ dissolved in 50 ml of water, without regulating the pH. The product is filtered off with suction, washed free of salt and dried at 80EC. The result is a gold-colored interference pigment which when the viewing angle is altered displays first an orange color and then a reddish violet color.

Example 3

In a bead mill, 500 ml of a 3% strength dispersion of DPP BO Red particles (Ciba) are prepared. To aid dispersion, 0.5% of a dispersing additive (Hydropallat 884 from Henkel) are added. This suspension is then mixed 1:1 with waterglass. This dispersion is converted as described in PCT/EP 92/02351, with the aid of a continuous belt, into $SiO_2$ flakes which contain DPP Red particles.

100 g of the flakes obtained in this way are suspended in 2 l of water and heated to 75° C. A solution consisting of 10 g of $SnCl_4.5H_2O$ and 30 ml of 37% strength HCl in 200 ml of water is metered into the suspension. During the addition, the pH is kept constant with 32% strength NaOH solution. After the end of the addition of the $SnCl_4$ solution, 450 ml of $TiCl_4$ solution (400 g of $TiCl_4$/l of water) are metered in. Simultaneously but separately, a suspension of 10 g of Prussian Blue in 440 ml of water is added. During coating, the pH is kept constant by adding 32% strength NaOH solution. After the end of the addition, stirring is continued at 75° C. for 15 minutes. The pigment is filtered off, washed free of salt and dried at 150° C.

The result is a gold-colored interference pigment which when the viewing angle is altered displays first a green color and then a bluish violet color.

Example 4

In a bead mill, 500 ml of a 3% dispersion of cobalt oxide particles are prepared. To aid dispersion, 0.5% of a dispersing additive (Hydropallat 884 from Henkel) are added. This suspension is then mixed 1:1 with waterglass. This dispersion is converted as described in PCT/EP 92/02351, with the aid of a continuous belt, into $SiO_2$ flakes which contain blue cobalt oxide particles. 100 g of the flakes obtained in this way are suspended in 2 l of water and heated to 75° C. A solution consisting of 10 g of $SnCl_4.5H_2O$ and 30 ml of 37% strength HCl in 200 ml of water is metered into the suspension. During the addition, the pH is kept constant with 32% strength NaOH solution. After the end of the addition of the $SnCl_4$ solution, 450 ml of TiCl solution (400 g of $TiCl_4$/l of water) are metered in. Simultaneously but separately, a suspension of 10 g of DPP Red BL in 430 ml of water is added. During coating, the pH is kept constant by adding 32% strength NaOH solution. After the end of the addition, stirring is continued at 75° C. for 15 minutes. The pigment is filtered off, washed free of salt and dried at 150° C.

The result is a gold-colored interference pigment which when the viewing angle is altered displays first an orange color and then a reddish violet color.

Example 5

100 g of mica (particle size 10–40 μm) are suspended in 2 l of water and the suspension is heated to 75° C. A solution consisting of 10 g of $SnCl_4.5H_2O$ and 30 ml of 37% strength HCl in 200 ml of water is metered into the suspension. During the addition, the pH is kept constant with 32% strength NaOH solution. After the end of the addition of the $SnCl_4$ solution, 450 ml of $TiCl_4$ solution (400 g of $TiCl_4$/l of water) are metered in. Simultaneously but separately, a suspension of 10 g of Prussian Blue in 440 ml of water is added. During coating, the pH is kept constant by adding 32% strength NaOH solution. After the end of the addition, stirring is continued at 75° C. for 15 minutes. The pigment is filtered off, washed free of salt and dried at 150EC. 50 g of the product obtained in this way are suspended in 1 l of water and heated to 75° C. A solution of 6 g of $AlCl_3.6H_2O$ in 100 ml of water is metered into the suspension at a pH of 8, the pH being kept constant by simultaneous addition of 10% strength NaOH. After a 30-minute stirring phase a pH of 4.3 is established and 2 ml of Ethomeen S12 are added.

Then a solution of 0.3 g of $AlCl_3.6H_2O$ in 100 ml of water and a solution of 1 g of Allura Red (FDC Red 40) in 100 ml of water are metered in. During coating, there is virtually no change in the pH, which is regulated by adding a few drops of 5% strength HCl. This is followed by the addition first of 50 ml of a dilute sodium waterglass solution (7.5 ml of sodium waterglass diluted with 42.5 ml of water) and then of 2.5 g of $AlK(SO_4)_2$ dissolved in 50 ml of water, without the pH being regulated. The product is filtered off with suction, washed free of salt and dried at 80EC. The result is a gold-colored interference pigment which when the viewing angle is altered displays first an orange color and then a reddish violet color.

What is claimed is:

1. A colored interference pigment comprising a platelet-shaped substrate layer, at least one coating of at least one metal oxide layer and, optionally, one or more further layers, at least two layers each comprising at least one colorant, the colorant being in particle form in the layers.

2. An interference pigment according to claim 1, which comprises a platelet-shaped substrate layer and a coating of at least one metal oxide layer, each of the substrate layer and the coating comprising at least one colorant.

3. An interference pigment according to claim 1, which comprises a platelet-shaped substrate layer, a coating of at least one metal oxide layer and a further layer which is a colorant layer on the coating, each of the substrate layer, the coating, and the colorant layer comprising at least one colorant.

4. An interference pigment according to claim 1, which comprises a platelet-shaped substrate layer, a coating of at least one metal oxide layer, and a further layer which is a colorant layer on the coating, each of the substrate layer and the colorant layer comprising at least one colorant.

5. An interference pigment according to claim 1, which comprises a platelet-shaped substrate layer, a coating of at least one metal oxide layer, and a further layer which is a colorant layer on the coating, each of the coating and the colorant layer comprising at least one colorant.

6. An interference pigment according to claim 1, wherein the platelet-shaped substrate layer is produced from a precursor on a continuous belt.

7. An interference pigment according to claim 1, wherein the at least one metal oxide layer comprises titanium dioxide, zirconium oxide, zinc oxide, an iron oxide, chromium oxide, antimony-doped tin oxide or a mixture thereof.

8. An interference pigment according to claim 1, wherein the colorant is an insoluble inorganic pigment, or an insoluble organic pigment.

9. A process for preparing the pigment according to claim 2, which comprises:
   dispersing a colorant in a precursor of the substrate material,
   applying the dispersion as a thin film to a continuous belt,
   solidifying the liquid film by drying,
   separating the resultant layer from the smooth surface and, optionally, treating with an acid,
   washing the resultant substrate particles, and
   coating the resultant substrate particles with one or more layers of metal oxides, the precipitation of the metal oxides taking place in the presence of a dispersion of a colorant.

10. A process for preparing the pigment according to claim 3, which comprises:
    dispersing or dissolving a colorant in a precursor of the substrate material, applying the dispersion as a thin film to a continuous belt, solidifying the liquid film by drying, separating the resultant layer from the smooth surface and, optionally, treating with an acid, washing the resultant substrate particles, coating the resultant substrate particles with one or more layers of metal oxides, the precipitation of the metal oxides taking place in the presence of a dispersion or solution of a colorant, and applying a further layer which is a colorant layer containing a colorant in particle form to the coating, wherein at least one of the colorant in the precursor of the substrate material and the colorant precipitated with the metal oxides is provided as a dispersion of a colorant in particle form.

11. A process for preparing the pigment according to claim 4, which comprises:

dispersing a colorant in a precursor of the substrate material, applying the dispersion as a thin film to a continuous belt, solidifying the liquid film by drying, separating the resultant layer from the smooth surface and, optionally, treating it with an acid, washing the resultant substrate particles, coating the resultant substrate particles with one or more layers of metal oxides, and applying a further layer which is a colorant layer layer containing a colorant in particle form to the coating.

12. A process for preparing the pigment according to claim 5, which comprises:

applying a precursor of the substrate material as a thin film to a continuous belt, solidifying the liquid film by drying, separating the resultant layer from the smooth surface and, optionally, treating it with an acid, washing the resultant substrate particles, coating the resultant substrate particles with one or more layers of metal oxides, the precipitation of the metal oxides taking place in the presence of a dispersion of a colorant in particle form, and applying a further layer which is a colorant layer containing a colorant in particle form to the coating.

13. A paint, printing ink, plastic, cosmetic, ceramic or glass composition pigmented with a pigment according to claim 1.

14. The interference pigment of claim 1, wherein the colorant is carbon black in particle form having an average particle size of 10–100 nm.

15. The interference pigment of claim 1, wherein the colorant is a metal oxide or organic pigment in particle form having an average particle size of 10–40 nm.

16. An interference pigment according to claim 1, wherein the platelet-shaped substrate layer comprises silica, silicates, boron oxide, borates, alumina or other transparent stable material for accommodating the colorant.

* * * * *